(12) United States Patent
Lin et al.

(10) Patent No.: US 11,314,586 B2
(45) Date of Patent: Apr. 26, 2022

(54) DATA STORAGE DEVICE AND NON-VOLATILE MEMORY CONTROL METHOD

(71) Applicant: Silicon Motion, Inc., Jhubei (TW)

(72) Inventors: Ting-Han Lin, Zhubei (TW); Che-Wei Hsu, Taichung (TW)

(73) Assignee: SILICON MOTION, INC., Jhubei (TW)

( * ) Notice: Subject to any disclaimer, the term of this patent is extended or adjusted under 35 U.S.C. 154(b) by 165 days.

(21) Appl. No.: 16/774,300

(22) Filed: Jan. 28, 2020

(65) Prior Publication Data
US 2020/0394099 A1 Dec. 17, 2020

Related U.S. Application Data

(60) Provisional application No. 62/862,196, filed on Jun. 17, 2019.

(30) Foreign Application Priority Data

Oct. 15, 2019 (TW) ................................. 108136998

(51) Int. Cl.
*H03M 13/00* (2006.01)
*G06F 11/10* (2006.01)
(Continued)

(52) U.S. Cl.
CPC ...... *G06F 11/1004* (2013.01); *G06F 9/30032* (2013.01); *G06F 11/0772* (2013.01);
(Continued)

(58) Field of Classification Search
CPC ............. G06F 11/1004; G06F 11/1044; G06F 11/0772; G06F 12/0246; G06F 12/0253; G06F 9/30032; G06F 2212/7201
See application file for complete search history.

(56) References Cited

U.S. PATENT DOCUMENTS

| | | | |
|---|---|---|---|
| 5,696,929 A | 12/1997 | Hasbun et al. | |
| 6,092,231 A * | 7/2000 | Sze | G11B 20/1866 714/758 |

(Continued)

FOREIGN PATENT DOCUMENTS

| | | |
|---|---|---|
| TW | 201135746 A1 | 10/2011 |
| TW | 201919066 A | 5/2019 |

OTHER PUBLICATIONS

Non-Final Office Action dated Jun. 9, 2021, issued in U.S. Appl. No. 16/786,089.

(Continued)

*Primary Examiner* — Samir W Rizk
(74) *Attorney, Agent, or Firm* — McClure, Qualey & Rodack, LLP

(57) ABSTRACT

Mapping information management for data storage. A mapping information format without any uncorrectable flag bits (UNC bits) is shown. A controller provides a cyclic redundancy check (CRC) engine. In response to an uncorrectable marking command issued by a host, the controller operates the cyclic redundancy check engine to encode a data pattern with a biased encoding seed to generate biased cyclic redundancy check code. The controller programs the data pattern and the biased cyclic redundancy check code to the non-volatile memory. The data pattern, therefore, will not pass CRC. The uncorrectable marking command works.

18 Claims, 6 Drawing Sheets

(51) Int. Cl.
    *G06F 11/07* (2006.01)
    *G06F 12/02* (2006.01)
    *G06F 9/30* (2018.01)

(52) U.S. Cl.
    CPC ...... *G06F 11/1044* (2013.01); *G06F 12/0246* (2013.01); *G06F 12/0253* (2013.01); *G06F 2212/7201* (2013.01)

(56) References Cited

U.S. PATENT DOCUMENTS

| | | |
|---|---|---|
| 6,606,682 B1 | 8/2003 | Dang et al. |
| 8,245,101 B2 | 8/2012 | Olbrich et al. |
| 8,285,924 B1 | 10/2012 | Cohn et al. |
| 9,329,948 B2 | 5/2016 | Li et al. |
| 9,870,836 B2 | 1/2018 | Ooneda |
| 10,789,130 B1 | 9/2020 | Horspool et al. |
| 2002/0165911 A1 | 11/2002 | Gabber et al. |
| 2005/0268203 A1 | 12/2005 | Keays et al. |
| 2007/0079103 A1 | 4/2007 | Mimatsu |
| 2009/0077312 A1 | 3/2009 | Miura et al. |
| 2009/0108120 A1 | 4/2009 | Papania |
| 2009/0228634 A1 | 9/2009 | Nakamura et al. |
| 2010/0005366 A1 | 1/2010 | Dell et al. |
| 2010/0250855 A1 | 9/2010 | Watanabe et al. |
| 2011/0072199 A1 | 3/2011 | Reiter et al. |
| 2011/0161784 A1 | 6/2011 | Selinger et al. |
| 2011/0238629 A1* | 9/2011 | Post .................. G06F 12/0246 707/674 |
| 2011/0320864 A1 | 12/2011 | Gower et al. |
| 2011/0320914 A1 | 12/2011 | Alves et al. |
| 2012/0144109 A1 | 6/2012 | Balakrishnan et al. |
| 2013/0191703 A1 | 7/2013 | Meaney et al. |
| 2014/0013182 A1 | 1/2014 | Cheng et al. |
| 2014/0108855 A1 | 4/2014 | Gopakumar et al. |
| 2014/0279941 A1 | 9/2014 | Atkisson |
| 2015/0169465 A1 | 6/2015 | Slepon |
| 2015/0178201 A1 | 6/2015 | Sampathkumar et al. |
| 2015/0207807 A1 | 7/2015 | Guo |
| 2016/0098344 A1 | 4/2016 | Gorobets et al. |
| 2016/0098355 A1 | 4/2016 | Gorobets |
| 2016/0117252 A1 | 4/2016 | Thangaraj et al. |
| 2017/0308473 A1 | 10/2017 | Bassi |
| 2017/0371794 A1 | 12/2017 | Kan |
| 2018/0203627 A1 | 7/2018 | Gilda et al. |
| 2018/0275887 A1 | 9/2018 | Yang et al. |
| 2018/0285258 A1 | 10/2018 | Muchherla et al. |
| 2019/0004960 A1 | 1/2019 | Wang et al. |
| 2019/0026224 A1 | 1/2019 | Koo |
| 2019/0079882 A1 | 3/2019 | Kim et al. |
| 2019/0138391 A1 | 5/2019 | Hsiao et al. |
| 2019/0155685 A1* | 5/2019 | Kim .................. G06F 11/1048 |
| 2019/0347006 A1 | 11/2019 | Yeh et al. |
| 2020/0233757 A1 | 7/2020 | Ferreira et al. |
| 2020/0394099 A1 | 12/2020 | Lin et al. |
| 2020/0409856 A1 | 12/2020 | Navon et al. |
| 2020/0412379 A1 | 12/2020 | Lin et al. |

OTHER PUBLICATIONS

Non-Final Office Action dated Jun. 30, 2021, issued in U.S. Appl. No. 16/885,627.

Non-Final Office Action dated Feb. 18, 2021, issued in U.S. Appl. No. 16/786,089.

Non-Final Office Action dated Apr1. 1, 2021, issued in U.S. Appl. No. 16/774,207.

* cited by examiner

DATA STORAGE DEVICE AND NON-VOLATILE MEMORY CONTROL METHOD

CROSS REFERENCE TO RELATED APPLICATIONS

This application claims the benefit of U.S. Provisional Application No. 62/862,196, filed on Jun. 17, 2019, the entirety of which is incorporated by reference herein.

This application also claims priority of Taiwan Patent Application No. 108136998, filed on Oct. 15, 2019, the entirety of which is incorporated by reference herein.

BACKGROUND OF THE INVENTION

Field of the Invention

The present invention is related to non-volatile memory control techniques.

Description of the Related Art

There are various forms of non-volatile memory (NVM) for long-term data storage, such as flash memory, magnetoresistive random access memory (RAM), ferroelectric RAM, resistive RAM, spin transfer torque-RAM (ST-RAM), and so on. These non-volatile memories may be used as the storage medium in a data storage device.

With the advancement of technology, the storage capacity of data storage devices has become more and more powerful. Mapping information management techniques for large-sized data storage devices are called for.

BRIEF SUMMARY OF THE INVENTION

A mapping information format without any uncorrectable flag bit (UNC bit) is introduced. The mapping information format thus has a sufficient number of bits for physical address identification.

A data storage device in accordance with an exemplary embodiment of the present invention includes a non-volatile memory and a controller configured to control the non-volatile memory. The controller has a cyclic redundancy check engine. In response to an uncorrectable marking command issued by the host, the controller operates the cyclic redundancy check engine to encode a data pattern with a biased encoding seed to generate biased cyclic redundancy check code. The controller programs the data pattern and the biased cyclic redundancy check code to the non-volatile memory. The data pattern, therefore, will not pass CRC. The uncorrectable marking command works.

In an exemplary embodiment, the uncorrectable marking command indicates a logical address. The controller shifts the logical address to generate a biased logical address. The controller operates the cyclic redundancy check engine to use the biased logical address as the biased encoding seed. The data pattern may be zero.

In an exemplary embodiment, in response to a read command that the host issues to read data identified by the logical address, the controller reads the data pattern and the biased cyclic redundancy check code from the non-volatile memory. The controller operates the cyclic redundancy check engine to use the logical address as an encoding seed. The controller operates the cyclic redundancy check engine to generate cyclic redundancy check code for the data pattern based on the encoding seed. The controller operates the cyclic redundancy check engine to perform comparison and thereby to determine that the cyclic redundancy check code is different from the biased cyclic redundancy check code. Thus, the controller does not return the data pattern to the host.

In an exemplary embodiment, the controller reads the data pattern and the biased cyclic redundancy check code from the non-volatile memory according to mapping information of the logical address. The mapping information is managed in a mapping information format without any uncorrectable flag bits. In an exemplary embodiment, the uncorrectable marking unit introduced by the uncorrectable marking command is smaller than the management unit introduced by the mapping information format.

In an exemplary embodiment, when wrong data that fails error checking and correction is read from a first area of the non-volatile memory with cyclic redundancy check code based on a logical address, the controller programs the wrong data and the cyclic redundancy check code to the second area of the non-volatile memory. In response to a read command issued by the host to read data identified by the logical address, the controller may read the wrong data and the cyclic redundancy check code from the second area of the non-volatile memory. The controller operates the cyclic redundancy check engine to use the logical address as an encoding seed. The controller operates the cyclic redundancy check engine based on the wrong data and the encoding seed to generate wrong cyclic redundancy check code. The controller operates the cyclic redundancy check engine to perform comparison and thereby determines that the cyclic redundancy check code is different from the wrong cyclic redundancy check code. Thus, the controller does not return the wrong data to the host.

In an exemplary embodiment, error checking and correction is triggered by the read command that the host issues to read the non-volatile memory.

In an exemplary embodiment, error checking and correction is triggered by garbage collection that the controller performs on the non-volatile memory.

The aforementioned controller may be implemented in other architectures. The foregoing concept can be used to implement a non-volatile memory control method, which includes the following steps: providing a cyclic redundancy check engine; in response to an uncorrectable marking command issued by the host, operating the cyclic redundancy check engine to encode a data pattern with a biased encoding seed to generate biased cyclic redundancy check code; and programming the data pattern and the biased cyclic redundancy check code to a non-volatile memory.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows exemplary embodiments of carrying out the invention. This description is made for the purpose of illustrating the general principles of the invention and should not be taken in a limiting sense. The scope of the invention is best determined by reference to the appended claims.

A non-volatile memory for long-term data retention may be a flash memory, a magnetoresistive random access memory (RAM), a ferroelectric RAM, a resistive RAM, a spin transfer torque-RAM (STT-RAM) and so on. The following discussion uses flash memory as an example.

Today's data storage devices often use flash memory as the storage medium for storing user data from the host. There are many types of data storage devices, including memory cards, universal serial bus (USB) flash devices, solid-state drives (SSDs), and so on. In another exemplary embodiment, a flash memory may be packaged with a controller to form a multiple-chip package called eMMC (embedded multimedia card).

A data storage device using a flash memory as a storage medium can be applied in a variety of electronic devices, including a smartphone, a wearable device, a tablet computer, a virtual reality device, etc. A calculation module of an electronic device may be regarded as a host that operates the data storage device equipped on the electronic device to access the flash memory within the data storage device.

A data center may be built with data storage devices using flash memories as the storage medium. For example, a server may operate an array of SSDs to form a data center. The server may be regarded as a host that operates the SSDs to access the flash memories within the SSDs.

Flash memory has its special storage characteristics which are described below.

The host side distinguishes data by logical addresses (for example, logical block addresses LBAs or global host page numbers GHPs . . . ). As for where the data is actually stored in the flash memory, it is managed by mapping information.

Figure 1:
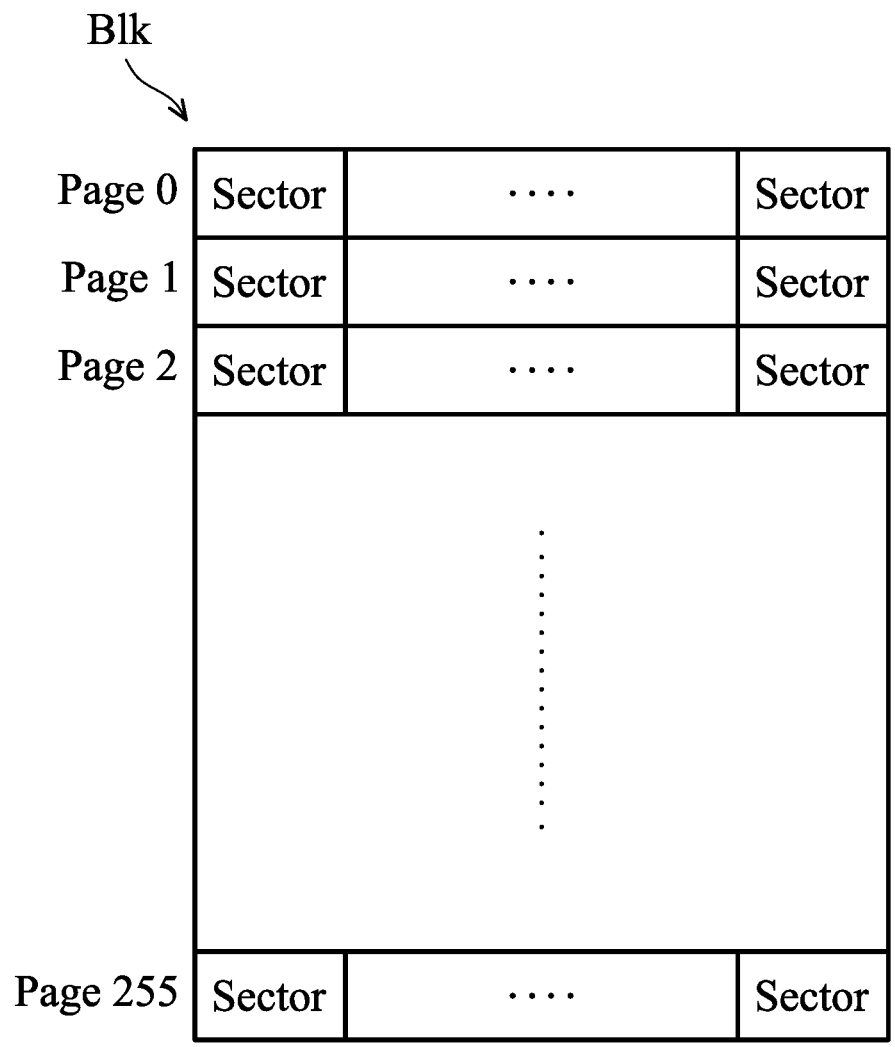
FIG. 1 illustrates the architecture of one block BLK.

The physical space of a flash memory is divided into a plurality of blocks. FIG. 1 illustrates the architecture of one block BLK, which includes a plurality of pages (e.g., page 0 to page 255). One implementation is to sequentially program a block according to the page number (from low to high). Each page includes a plurality of sectors (e.g., 32 sectors per page), and each sector may store 512B user data. A single write may cover multiple sectors. In a 4 KB data management mode, each data unit covers 8 sectors (4 KB) and the 8 sectors are managed together. A 16 KB page stores four data units (32 sectors). The four data units may correspond to four discontinuous logical addresses.

In particular, data is not updated to the storage space of the old data. The new version of the data must be written into a blank space and the old data is invalidated. A block may only have sporadic valid data remained. As a block cannot be reused until being erased, the spare blocks are gradually consumed. When the number of spare blocks is insufficient (for example, less than a threshold amount), a garbage collection demand occurs. Sporadic valid data in a block is collected into another block through garbage collection. Blocks with only invalid data remained is erased and released, and so that the number of spare blocks is increased to ensure the normal use of the flash memory. However, the garbage collection may result in logical non-sequential data (fragmented) within the same block.

As can be seen from the foregoing, the space allocation of flash memory is quite complicated. In an exemplary embodiment, a logical-to-physical address mapping table (L2P mapping table) is established, which maps logical addresses recognized at the host side to physical addresses of the flash memory. Preferably, the logical addresses are used as the index, and the corresponding physical addresses are listed in the logical-to-physical address mapping table L2P. The physical addresses are, for example, physical block addresses (PBAs). In another exemplary embodiment, a physical address includes block information Blk #, page information Page #, and data unit information Unit # (or an offset value). In some exemplary embodiments, the flash memory is accessed through multiple channels. Thus, the physical address further includes channel information CH #.

Figure 2A:
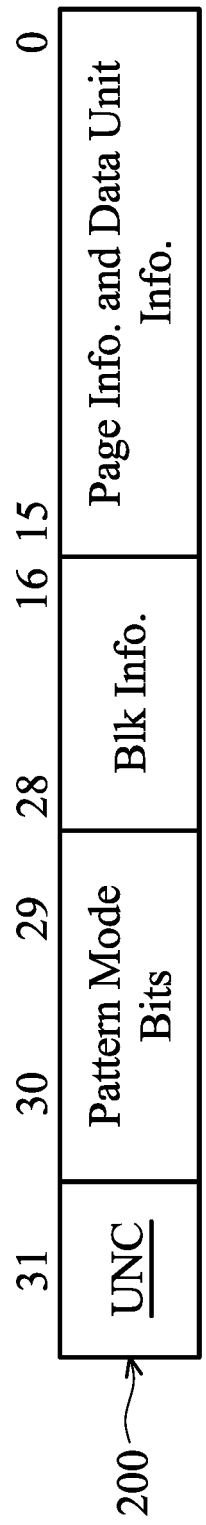
FIG. 2A illustrates a mapping information format 200 used in the conventional technology.

FIG. 2A illustrates a mapping information format 200 used in the conventional technology, including 32 bits (four bytes). The conventional mapping information format 200 includes:

Bit [31], a UNC (uncorrectable) flag bit reserved to indicate unreliable mapping information, (for example, error checking and correction (ECC) failed data is regarded as uncorrectable and the UNC flag bit has to be switched from "0" to "1", and possible causes of ECC failure include physical errors caused by environmental factors or time factors, errors generated during data reading, or errors caused during data programming);

Bits [30:29], reserved for setting a pattern mode, (e.g., in an exemplary embodiment, the data issued by the host to be programmed into the flash memory is first cached in a temporary storage, and the cached data is moved from the temporary storage to the flash memory when a programming condition, such as having the cached data reaching a certain amount or according to a timing, so that the mapping information may be switched between the different pattern modes to map to the temporary storage or the flash memory), wherein '00' or '01' represents that the subsequent bits [28: 0] shows a physical address of the flash memory, and '10' represents that the subsequent bits [28: 0] shows a physical address of the temporary storage, '11' represents that the following bits [28: 0] shows dummy mapping information; and Bits [28: 0], showing the physical address of the flash memory or the temporary storage, or showing dummy mapping information.

In the conventional mapping information format 200, bits [30:29] are pattern mode bits and a UNC flag bit is required. Thus, only 29 bits can be used to indicate a physical address and so that the storage capacity of the data storage device is limited.

Figure 2B:
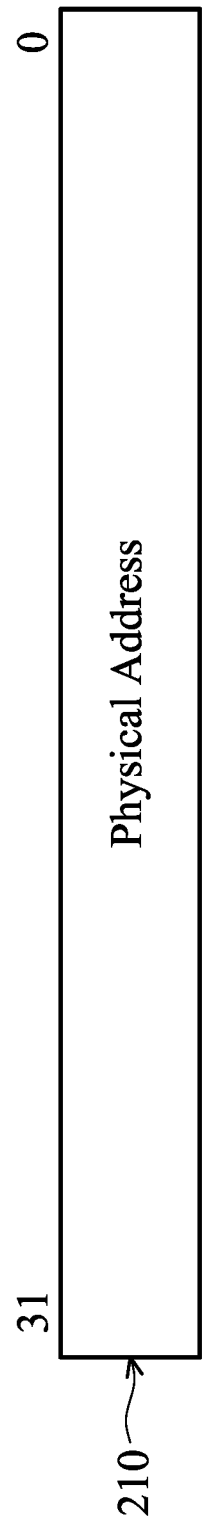
FIG. 2B illustrates a mapping information format 210 in accordance with an exemplary embodiment of the present invention.

In order to avoid the above problem, FIG. 2B illustrates a mapping information format 210 in accordance with an exemplary embodiment of the present invention, which includes 32 bits (four bytes), but does not reserve the UNC flag bit. Compared to the mapping information format 200, the mapping information format 210 has a larger number of bits that can be used to represent a physical address. The storage capacity of data storage device, therefore, can be at least doubled. In addition, the mapping information format 210 no longer includes pattern mode bits. The following describes in detail how to mark the uncorrectable data without reserving any UNC flag bit in the mapping information format.

Figure 3:
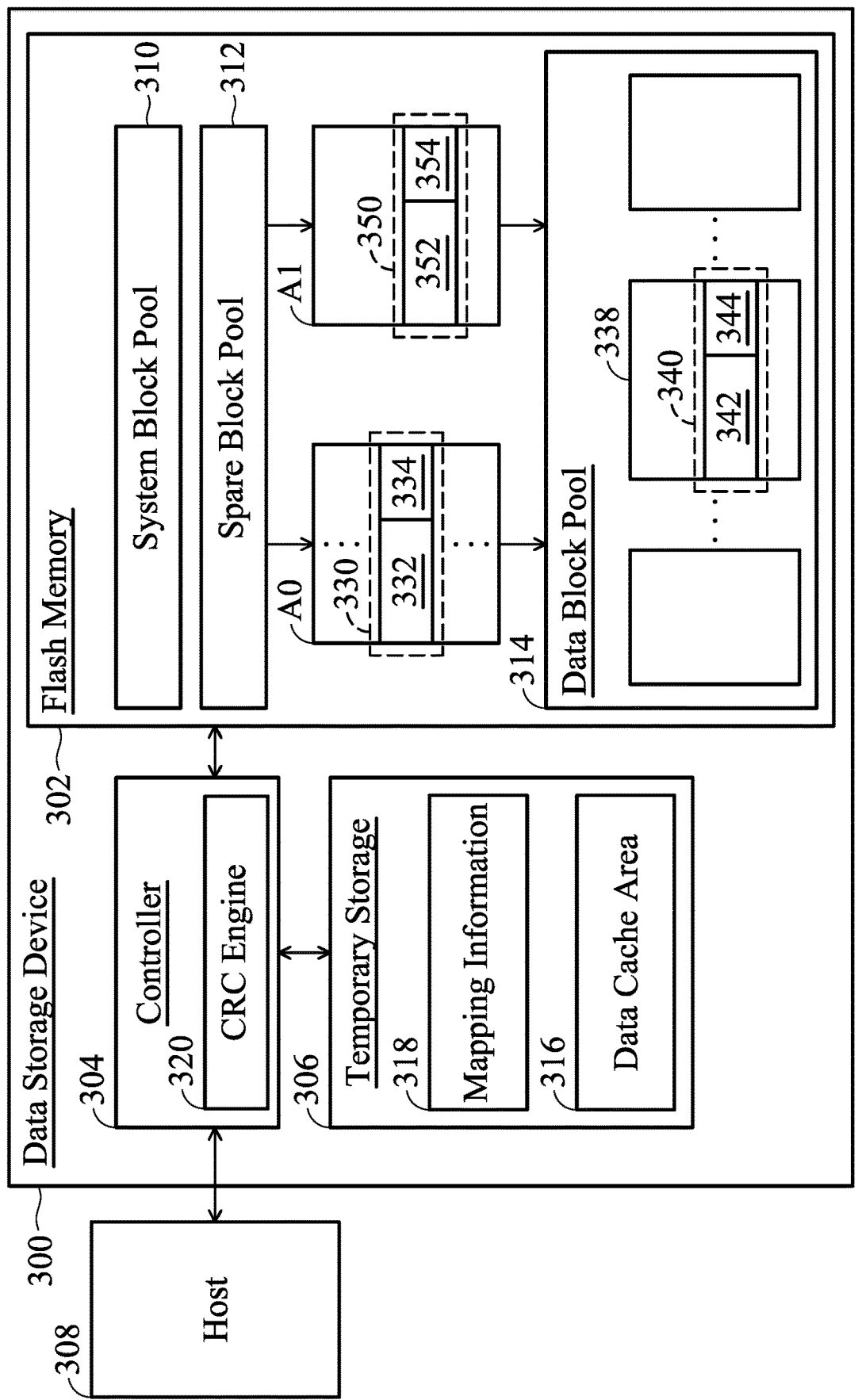
FIG. 3 is a block diagram illustrating a data storage device 30 in accordance with an exemplary embodiment of the present invention.

FIG. 3 is a block diagram illustrating a data storage device 300 in accordance with an exemplary embodiment of the present invention, which includes a flash memory 302, a controller 304, and a temporary storage 306. The host 308 operates the flash memory 302 through the controller 304. Within the data storage device 300, the controller 304 may spontaneously initiate the optimization of the flash memory 302, such as arranging the space of the flash memory 302 to maximize the storage performance. The controller 304 uses the temporary storage 306 to temporarily store the data required during calculations. The temporary storage 306 may be a dynamic random access memory (DRAM) or a static random access memory (SRAM).

The flash memory 302 includes a plurality of blocks. The blocks storing system information are pushed into a system information pool 310. For example, system blocks storing mapping information implement the non-volatile storage of mapping information. An active block A0 taken from a spare block pool 312 is used to program the write data issued by the host 308. After the programming of the active block A0 is completed, the active block A0 is pushed into the data block pool 314 as a data block. After running for a period of time, some data may be updated frequently, leaving only sporadic valid data in some data blocks. These data blocks may be released by garbage collection and pushed back to the spare block pool 312. A destination block A1 for garbage collection is selected from the spare block pool 312. After the destination block A1 is filled with data, it is also pushed into the data block pool 314.

As shown, the controller 304 first caches data in a data cache space 316 of the temporary storage 306, and then programs the cached data from the data cache space 316 to the active block A0. The controller 304 may use the space 318 of the temporary storage 306 to dynamically update the mapping information. The controller 304 includes a cyclic redundancy check (CRC) engine 320. An uncorrectable marking command (e.g., a UNC write command "WriteUNC") issued by the host 308 indicates a target logical address LBA. When executing the UNC write command issued by the host 308, the controller 304 shifts the target logical address LBA to generate a biased logical address LBA_UNC, and then operates the CRC engine 320 to use the biased logical address LBA_UNC as an encoding seed, and encodes a data pattern P with the encoding seed to generate biased cyclic redundancy check code CRC_UNC. The controller 304 programs the data pattern P and the biased cyclic redundancy check code CRC_UNC to a blank data unit 330 of the active block A0. For example, the data pattern P is filled into the data area 332 of the blank data unit 330. The biased cyclic redundancy check code CRC_UNC is filled into the metadata area 334 of the blank data unit 330 as a UNC mark and thereby the execution of the UNC write command is completed. Accordingly, the mapping information of the target logical address LBA is updated. In an exemplary embodiment, the data pattern P is zero. In another exemplary embodiment, the data pattern P is the data stored in the original physical address mapped to the target logical address LBA.

Thereafter, when the host 308 requests to read the data of the target logical address LBA, the CRC engine 320 uses the target logical address LBA as the encoding seed S to encode the data pattern P read from the data area 332 and thereby the corresponding cyclic redundancy check code (labeled as CRC) is generated. Because the generated cyclic redundancy check code CRC does not match the biased cyclic redundancy check code CRC_UNC read from the metadata area 334. Therefore, the controller 304 returns a preset message to the host 308. For example, the preset message may recite that the target logical address LBA has not been mapped to any physical address, or the target logical address LBA has been cleared. In such an example, a UNC write command is executed successfully. The target logical address LBA is successfully invalidated or regarded as unreliable.

In an exemplary embodiment, the host 308 issues a read command to read data of a target logical address LBA but the read data is wrong. The controller 304 reads the wrong data D_ERR and the corresponding cyclic redundancy check code CRC from the data area 342 and the metadata area 344 of the data unit 340 of the data block 338, respectively. When the controller 304 fails to correct the wrong data D_ERR by error checking and correction (ECC), the wrong data D_ERR is ECC failed. In this exemplary embodiment, the controller 304 programs the wrong data D_ERR and the corresponding cyclic redundancy check code CRC to the active block A0 (for example, being programmed to the data area 332 and the metadata area 334 of the data unit 330) as marking the UNC situation. Later, when the host 308 requests to read the data of the target logical address LBA again, the controller 304 operates the CRC engine 320 based on the target logical address LBA and the wrong data D_ERR and thereby the wrong cyclic redundancy check code CRC_ERR is generated. The wrong cyclic redundancy check code CRC_ERR does not match the cyclic redundancy check code CRC read from the metadata area 334, so that the controller 304 returns the preset message to the host 308. The wrong data D_ERR of the target logical address LBA is successfully invalidated or is not used to respond to the host 308, which follows the spirit of UNC marking.

ECC failure may also occur during garbage collection. In an exemplary embodiment, the controller 304 uses the data block 338 as a source block of garbage collection, reads the data unit 340, and copies the wrong data D_ERR (read from the data area 342) and the cyclic redundancy check code CRC (read from the metadata area 344) to a destination block A1. Before programming the copied data to the destination block A1, the controller 304 performs the ECC process on the wrong data D_ERR, and as a result, the ECC fails. However, the controller 304 still programs the wrong data D_ERR and the cyclic redundancy check code CRC to the destination block A1 (for example, being programmed to the data area 352 and the metadata area 354 of the data unit 350). The uncorrectable situation, UNC, is marked by the programming. Later, when the host 308 issues to read data of a target logical address LBA that is stored in the data area 352, the controller 304 operates the CRC engine 320 based on the wrong data D_ERR read from the data area 352 and thereby a wrong cyclic redundancy check code CRC_ERR is calculated. Because the wrong cyclic redundancy check code CRC_ERR is different from the cyclic redundancy check code CRC read from the metadata area 354, the controller 304 returns a preset message to the host 308. The data of the target logical address LBA is successfully invalidated or regarded as unreliable. The data of the target logical address LBA is successfully regarded as uncorrectable.

In an exemplary embodiment, the CRC engine 320 performs CRC encoding in units of sectors. Each sector (512B) corresponds to 2B CRC code. Each data unit (4 KB) corresponds to 8 batches of CRC code. Note that data shorter than 4 KB has the corresponding CRC code its own. Any 512B data has the corresponding 2B CRC code. The cyclic redundancy check code CRC or the biased cyclic redundancy check code CRC_UNC implements the UNC marking for 512B (sector length), 4 KB (data unit length) or the other data length. The technology in this case makes it possible to mark UNC in units smaller than the mapping information management unit (4 KB) corresponding to the mapping information format 210. The uncorrectable marking unit (512B) introduced by the uncorrectable marking command is smaller than the management unit (4 KB) introduced by the mapping information format 210.

Figure 4:
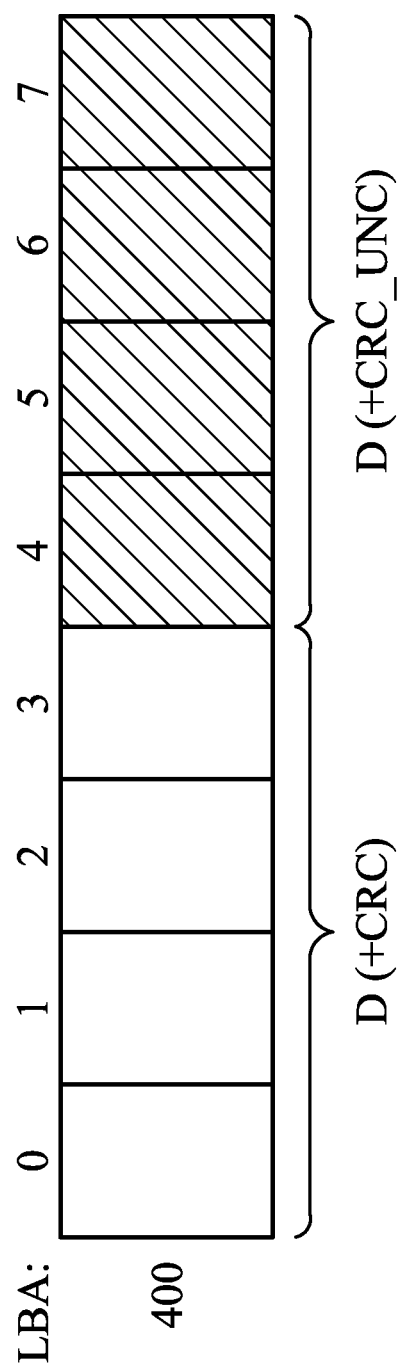
FIG. 4 corresponds to a data unit 400 of a page in the flash memory 302 that is marked uncorrectable (UNC) by a UNC write command (WriteUNC)

FIG. 4 corresponds to a data unit 400 of a page in the flash memory 302 that is marked uncorrectable (UNC) by a UNC write command (WriteUNC). The data unit 400 includes 8 sectors and is 4 KB (8*512B), corresponding to logical addresses LBA #0~#7. The UNC write command indicates a starting logical address, LBA #4, and a logical address length, 4. Accordingly, the controller 304 marks the logical addresses LBA #4~#7 in the logical addresses LBA #0~#7 as uncorrectable. As shown, the controller 304 programs data D of logical addresses LBA #0~#3 into the first four sectors of the data unit 400 corresponding unbiased cyclic redundancy check code CRC. As for LBA #4~#7 to be marked as UNC, the controller 304 operates the CRC engine 320 to encode data D of LBA #4~#7 with the biased logical addresses LBA #5~#8. Thus, biased cyclic redundancy check code CRC_UNC #4~#7 are generated. The controller 304 programs data D of LBA #4~#7 to the last four sectors of the data unit 400 to correspond to the biased cyclic redundancy check code CRC_UNC #4~#7. The UNC write command is realized by the biased cyclic redundancy check code CRC_UNC #4~#7.

Figure 5:
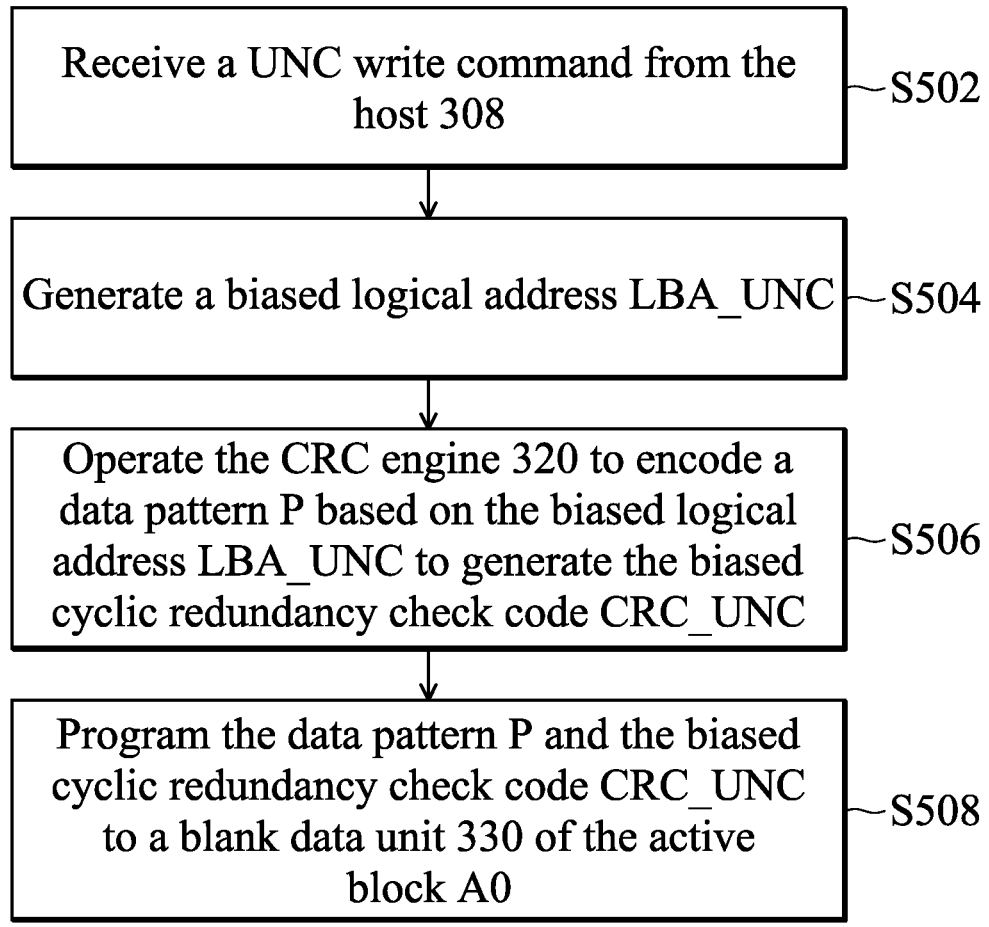
FIG. 5 is a flowchart illustrating a procedure introduced by a UNC write command (WriteUNC) in accordance with an exemplary embodiment of the present invention.

FIG. 5 is a flowchart illustrating a procedure introduced by a UNC write command (WriteUNC) in accordance with an exemplary embodiment of the present invention.

In step S502, the controller 304 receives a UNC write command from the host 308, wherein the UNC write command indicates a target logical address LBA.

In step S504, the controller 304 generates a biased logical address LBA_UNC, wherein the biased logical address LBA_UNC may be generated based on the target logical address LBA, or may be randomly generated.

In step S506, the controller 304 operates the CRC engine 320 to encode a data pattern P based on the biased logical address LBA_UNC to generate the biased cyclic redundancy check code CRC_UNC, where the data pattern P may be "0" or the original data stored in the flash memory 302 corresponding to the target logical address LBA.

In step S508, the controller 304 programs the data pattern P and the biased cyclic redundancy check code CRC_UNC to a blank data unit 330 of the active block A0.

Figure 6:
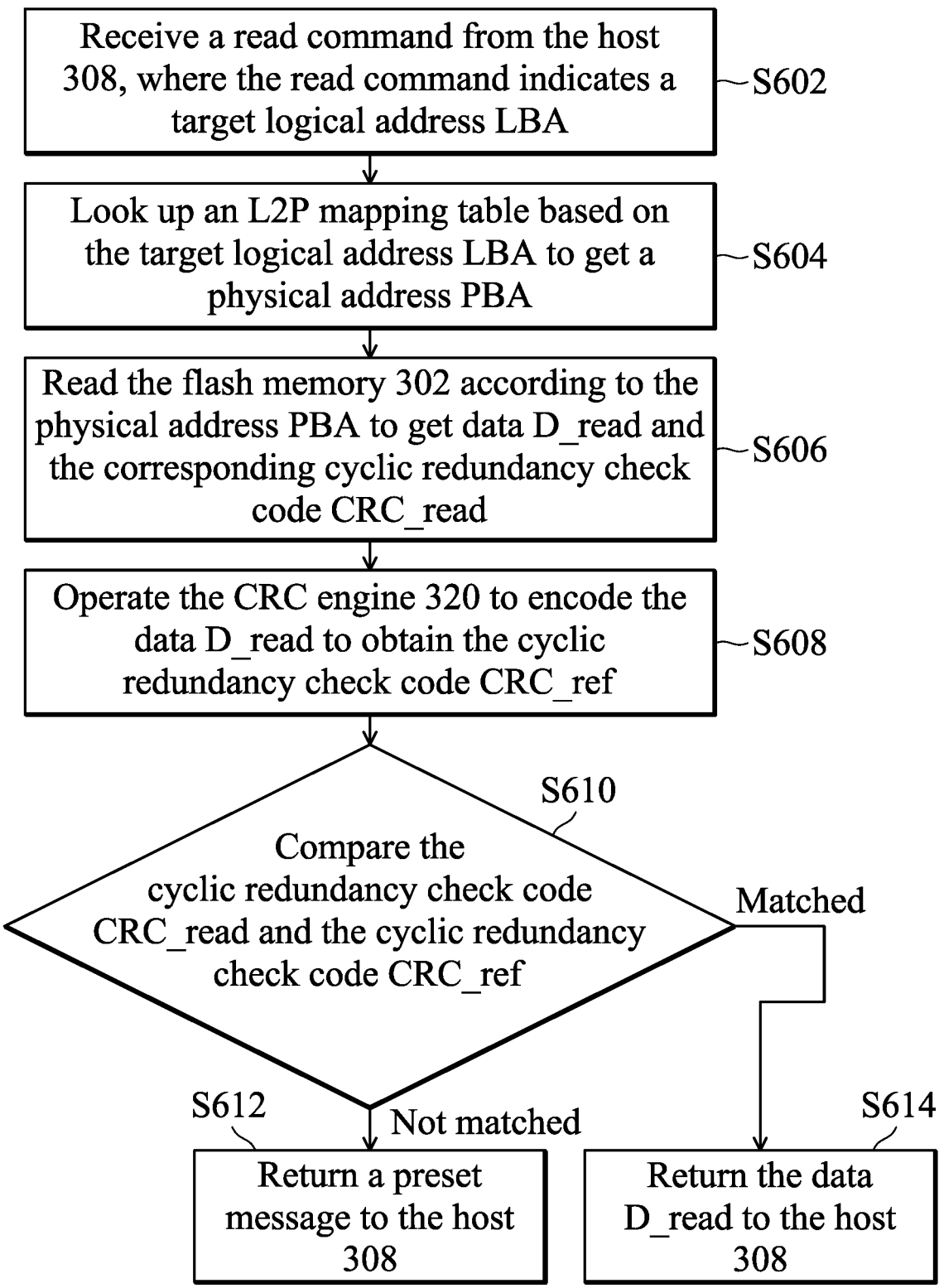
FIG. 6 is a flowchart illustrating how the controller 304 responds to a read request issued by the host 308 in accordance with an exemplary embodiment of the present invention.

FIG. 6 is a flowchart illustrating how the controller 304 responds to a read request issued by the host 308 in accordance with an exemplary embodiment of the present invention.

In step S602, the controller 304 receives a read command from the host 308, where the read command indicates a target logical address LBA.

In step S604, the controller 304 looks up an L2P mapping table based on the target logical address LBA to get a physical address PBA.

In step S606, the controller 304 reads the flash memory 302 according to the physical address PBA to get data D_read and the corresponding cyclic redundancy check code CRC_read.

In step S608, the controller 304 operates the CRC engine 320 to encode the data D_read to obtain the cyclic redundancy check code CRC_ref.

In step S610, the controller 304 compares the cyclic redundancy check code CRC_read and the cyclic redundancy check code CRC_ref. When CRC_read is different from CRC_ref, step S612 is performed and the controller 304 returns a preset message to the host 308 without transferring the data D_read to the host 308. When CRC_read is equal to CRC_ref, step S614 is performed and the controller 304 returns the data D_read to the host 308 in response to the read request.

The memory controller 304 controlling the flash memory 302 may be implemented in other architectures. Any techniques using the forgoing concepts to operate a flash memory without reserving UNC flag bits in the mapping information format are within the scope of the present invention. In some exemplary embodiments, control methods for non-volatile memory may be realized based on the foregoing concept.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
  a non-volatile memory;
  a controller, configured to control the non-volatile memory and comprising a cyclic redundancy check engine,
  wherein:
  in response to an uncorrectable marking command issued by a host, the controller operates the cyclic redundancy check engine to encode a data pattern with a biased encoding seed to generate biased cyclic redundancy check code;
  the controller programs the data pattern and the biased cyclic redundancy check code to the non-volatile memory;
  the uncorrectable marking command indicates a first logical address;
  the controller shifts the first logical address to generate a biased logical address; and
  the controller operates the cyclic redundancy check engine to use the biased logical address as the biased encoding seed.

2. The data storage device as claimed in claim 1, wherein: the data pattern is zero.

3. The data storage device as claimed in claim 1, wherein:
  in response to a read command that the host issues to read data identified by the first logical address, the controller reads the data pattern and the biased cyclic redundancy check code from the non-volatile memory;
  the controller operates the cyclic redundancy check engine to use the first logical address as an encoding seed;

the controller operates the cyclic redundancy check engine to generate cyclic redundancy check code for the data pattern based on the encoding seed;

the controller operates the cyclic redundancy check engine to perform comparison and thereby determines that the cyclic redundancy check code is different from the biased cyclic redundancy check code; and the controller does not return the data pattern to the host.

4. The data storage device as claimed in claim 3, wherein:

the controller reads the data pattern and the biased cyclic redundancy check code from the non-volatile memory according to mapping information of the first logical address; and the mapping information is managed in a mapping information format without any uncorrectable flag bits.

5. The data storage device as claimed in claim 4, wherein:

an uncorrectable marking unit introduced by the uncorrectable marking command is smaller than a management unit introduced by the mapping information format.

6. The data storage device as claimed in claim 1, wherein:

when wrong data that fails error checking and correction is read from a first area of the non-volatile memory with cyclic redundancy check code based on a second logical address, the controller programs the wrong data and the cyclic redundancy check code to the a second area of the non-volatile memory.

7. The data storage device as claimed in claim 6, wherein:

in response to a read command issued by the host to read data identified by the second logical address, the controller reads the wrong data and the cyclic redundancy check code from the second area of the non-volatile memory;

the controller operates the cyclic redundancy check engine to use the second logical address as an encoding seed;

the controller operates the cyclic redundancy check engine based on the wrong data and the encoding seed to generate wrong cyclic redundancy check code;

the controller operates the cyclic redundancy check engine to perform comparison and thereby determines that the cyclic redundancy check code is different from the wrong cyclic redundancy check code; and the controller does not return the wrong data to the host.

8. The data storage device as claimed in claim 6, wherein:

error checking and correction is triggered by a read command that the host issues to read the non-volatile memory.

9. The data storage device as claimed in claim 6, wherein:

error checking and correction is triggered by garbage collection that the controller performs on the non-volatile memory.

10. A non-volatile memory control method, comprising:

providing a cyclic redundancy check engine;

in response to an uncorrectable marking command issued by a host, operating the cyclic redundancy check engine to encode a data pattern with a biased encoding seed to generate biased cyclic redundancy check code; and programming the data pattern and the biased cyclic redundancy check code to a non-volatile memory, wherein:

a first logical address indicated by the uncorrectable marking command is shifted to generate a biased logical address; and the cyclic redundancy check engine is operated to use the biased logical address as the biased encoding seed.

11. The non-volatile memory control method as claimed in claim 10, wherein:

the data pattern is zero.

12. The non-volatile memory control method as claimed in claim 10, further comprising:

in response to a read command that the host issues to read data identified by the first logical address, reading the data pattern and the biased cyclic redundancy check code from the non-volatile memory;

operating the cyclic redundancy check engine to use the first logical address as an encoding seed;

operating the cyclic redundancy check engine to generate cyclic redundancy check code for the data pattern based on the encoding seed;

operating the cyclic redundancy check engine to perform comparison and thereby determine that the cyclic redundancy check code is different from the biased cyclic redundancy check code; and not returning the data pattern to the host.

13. The non-volatile memory control method as claimed in claim 12, wherein:

the data pattern and the biased cyclic redundancy check code are read from the non-volatile memory according to mapping information of the first logical address; and the mapping information is managed in a mapping information format without any uncorrectable flag bits.

14. The non-volatile memory control method as claimed in claim 13, wherein:

a uncorrectable marking unit introduced by the uncorrectable marking command is smaller than a management unit introduced by the mapping information format.

15. The non-volatile memory control method as claimed in claim 10, further comprising:

in response to wrong data that fails error checking and correction and is read from a first area of the non-volatile memory with cyclic redundancy check code based on a second logical address, programming the wrong data and the cyclic redundancy check code to the a second area of the non-volatile memory.

16. The non-volatile memory control method as claimed in claim 15, further comprising:

in response to a read command issued by the host to read data identified by the second logical address, reading the wrong data and the cyclic redundancy check code from the second area of the non-volatile memory;

operating the cyclic redundancy check engine to use the second logical address as an encoding seed;

operating the cyclic redundancy check engine based on the wrong data and the encoding seed to generate wrong cyclic redundancy check code;

operating the cyclic redundancy check engine to perform comparison and thereby determine that the cyclic redundancy check code is different from the wrong cyclic redundancy check code; and not returning the wrong data to the host.

17. The non-volatile memory control method as claimed in claim 15, wherein:

error checking and correction is triggered by a read command that the host issues to read the non-volatile memory.

18. The non-volatile memory control method as claimed in claim 15, wherein:

error checking and correction is triggered by garbage collection that the controller performs on the non-volatile memory.

* * * * *